US007587182B2

(12) United States Patent
Kawai

(10) Patent No.: US 7,587,182 B2
(45) Date of Patent: Sep. 8, 2009

(54) RECEIVER INPUT CIRCUIT

(75) Inventor: Kazuo Kawai, Tokyo (JP)

(73) Assignee: General Research of Electronics, Inc., Tokyo (JP)

( * ) Notice: Subject to any disclaimer, the term of this patent is extended or adjusted under 35 U.S.C. 154(b) by 514 days.

(21) Appl. No.: 11/538,112

(22) Filed: Oct. 3, 2006

(65) Prior Publication Data

US 2007/0099589 A1    May 3, 2007

(30) Foreign Application Priority Data

Oct. 5, 2005    (JP) ............................. 2005-292764

(51) Int. Cl.
*G06F 3/033* (2006.01)
*H04B 1/18* (2006.01)

(52) U.S. Cl. .................. 455/130; 455/150.1; 455/193.1

(58) Field of Classification Search ................ 455/130, 455/150.1, 154.1, 193.1, 197.3, 161.1; 333/126, 333/129, 132
See application file for complete search history.

(56) References Cited

U.S. PATENT DOCUMENTS 5,914,640 A * 6/1999 Nasserbakht ................ 330/294

| 6,862,432 B1 * | 3/2005 | Kim ............................. 455/80 |
| 7,174,142 B2 * | 2/2007 | Watabe ..................... 455/193.1 |
| 7,483,727 B2 * | 1/2009 | Zhu et al. ................. 455/575.5 |

* cited by examiner

*Primary Examiner*—Sonny Trinh
(74) *Attorney, Agent, or Firm*—Trexler, Bushnell, Giangiorgi, Blackstone & Marr, Ltd.

(57) ABSTRACT

A receiver input circuit comprises an R-∞ type low-pass filter, a small-capacitance type coupling capacitor element and a parallel tuning circuit. The low-pass filter has an inductor element and a first capacitor element both connected in series, and a shunt-connected second capacitor element. The first and second capacitor elements are equivalent to ones obtained by dividing a normal shunt-connected capacitor element into two. A total capacitance value thereof is selected equal to the capacitance value of the normal shunt-connected capacitor element. The parallel tuning circuit makes use of a tuning first variable capacitance type capacitor element. A second variable capacitance type capacitor element is used for the small-capacitance type coupling capacitor element. When a tuning frequency of the parallel tuning circuit is changed by adjusting the capacitance of the first variable capacitance type capacitor element, the capacitance value of the small-capacitance type coupling capacitor element is changed in conjunction with the adjustment to its capacitance.

2 Claims, 2 Drawing Sheets

TUNING FREQUENCY

RECEIVER INPUT CIRCUIT

RELATED/PRIORITY APPLICATION

This application claims priority with respect to Japanese Application No. 2005-292764, filed Oct. 5, 2005.

BACKGROUND OF THE INVENTION

1. Field of the Invention

The present invention relates to a receiver input circuit connected and disposed between a receiving antenna and a high frequency amplifier, and to a receiver input circuit which is equipped with an antenna impedance matching circuit and an LC parallel tuning circuit connected to the output side of the antenna impedance matching circuit and which is capable of attaining matching to antenna impedance without performing time-consuming adjustments, and obtaining a uniform frequency selective characteristic and a satisfactory noise figure.

2. Description of the Related Art

In a receiver that receives a high-frequency signal wave lying in a band of a few hundreds of MHz, ones of various circuit formats have been used as receiver input circuits thereof. However, the following are known as relatively well-used ones of the receiver input circuits.

In the first receiver input circuit, an inductor element with an intermediate tap is used as an inductor element that constitutes an LC parallel tuning circuit. A first variable capacitance type capacitor element is connected between the intermediate tap of the inductor element with the same and an antenna input terminal. When the tuning frequency of the LC parallel tuning circuit is adjusted by changing the capacitance of a second variable capacitance type capacitor element of the LC parallel tuning circuit, an adjustment to the capacitance of the second variable capacitance type capacitor element and an adjustment to the capacitance of the first variable capacitance type capacitor element are made together, thereby attaining the setting of the tuning frequency and matching to antenna impedance.

In the second receiver input circuit, as an alternative to the use of the inductor element with the intermediate tap as the inductor element that constitutes the LC parallel tuning circuit, an additive inductor element smaller in the number of turns than the above inductor element is inductively coupled to the corresponding inductor element. A first variable capacitance type capacitor element is connected between one end of the additive inductor element and an antenna input terminal. When the tuning frequency of the LC parallel tuning circuit is adjusted by changing the capacitance of a second variable capacitance type capacitor element of the LC parallel tuning circuit, an adjustment to the capacitance of the second variable capacitance type capacitor element and an adjustment to the capacitance of the first variable capacitance type capacitor element are made together, thereby attaining the setting of the tuning frequency and matching to antenna impedance.

Further, in the third receiver input circuit, a series-connected circuit of a first variable capacitance type capacitor element having a small capacitance value and a second variable capacitance type capacitor element having a large capacitance value is used as a capacitor element constituting an LC parallel circuit, as an alternative to the use of the inductor element with the intermediate tap as the inductor element that constitutes the LC parallel tuning circuit. A connecting point of the first and second variable capacitance type capacitor elements and an antenna input terminal are connected to each other. The tuning frequency of the LC parallel tuning circuit is adjusted by principally adjusting the capacitance value of the first variable capacitance type capacitor element having the small capacitance. Matching to antenna impedance is performed by principally adjusting the capacitance value of the second variable capacitance type capacitor element having the large capacitance. Therefore, the setting of the tuning frequency and the matching to the antenna impedance are attained by performing their adjustments together.

In this case, any of such known first through third receiver input circuits needs to carry out together, the adjustment to the tuning frequency of the LC parallel tuning circuit and the adjustment for the matching to the antenna impedance each time a signal wave received and selected by each receiving station is changed. Since, however, the adjustment to the tuning frequency and the adjustment for the matching to the antenna impedance cannot be performed under states independent of each other, respectively, there is a need to repeatedly perform these two adjustments on several occasions and thereby obtain their best points for the purpose of obtaining the best conditions for the two states. Therefore, the state of the receiver input circuit can finally be adjusted so as to be best if such two adjustments are repeatedly performed. When, however, signal waves from many receiving stations are received and selected one after another, there is a need to perform such two adjustments in an extremely short period of time each time the signal waves from the respective receiving stations are received and selected. An adjuster who performs these adjustments takes time and efforts or trouble over their adjustments excessively. This becomes a large burden on the adjuster.

With an increase in communication demand and the progress of broadening or wider bandwidth of a usable frequency wave, frequency allocations that respective specific frequency bands are used have recently been performed according to use objectives. There has thus been under the condition that many signal waves different in frequency exist within a frequency band narrower than the above bands. Therefore, it can be said that the execution of both the adjustment to the tuning frequency and the adjustment for the matching to the antenna impedance for every receiving selection of many specific stations where signal waves sent from the specific stations are selected by a receiver, is an extremely unrealistic means. Therefore, one for simply performing only the adjustment for the tuning frequency in the receiver input circuit without performing the adjustment for the matching to the antenna impedance in particular, or one for allowing a station selecting operation done by an LC parallel tuning circuit and a frequency selective characteristic to depend on a frequency selecting function of an intermediate frequency stage or the like lying subsequent to a frequency conversion stage without the use of the LC parallel tuning circuit by simply using a wideband bandpass filter in the receiver input circuit has frequently appeared in recent years.

However, in the receiver input circuit that performs only the adjustment to the tuning frequency without carrying out the adjustment for the matching to the antenna impedance, the matching to the antenna impedance is fixed to its matching approximate point, and a noise figure is considerably degraded although a characteristic to be almost satisfied can be obtained as to frequency selectivity. The receiver input circuit with no use of the LC parallel tuning circuit applies many frequency signals to the frequency conversion stage simultaneously by simply using the wideband bandpass filter. Therefore, image selectivity and an inter-modulation characteristic are deteriorated and an improvement in noise figure cannot be expected.

Meanwhile, a decision as to whether the noise figure is good or bad is performed based on grounds to be described below. That is, the noise figure of the receiver input circuit is generally expressed in the following equation according to "Electronic Information Communication Handbook", published by Ohmsha Ltd., Institute of Electronics, Information and Communication Engineers, pp. 2398, 1988:

$$F=1+(R_s/R_0)+(R_N/R_s)\{(1+R_s/R_0)\} \quad (1)$$

In this case, $R_0$ is a termination resistor or resistance of the input circuit and indicates a parallel value of resonance impedance of an LC parallel tuning circuit and input impedance of a high frequency amplifier when the LC parallel tuning circuit is used. $R_s$ is impedance as seen on the input side from an input point of the high frequency amplifier and indicates impedance other than the termination resistance $R_0$. $R_N$ indicates an equivalent noise resistance obtained by converting all noise of a post-stage high frequency amplifier inclusive of a first-stage high frequency amplifier to an input terminal of the first-stage high frequency amplifier.

When antenna impedance and the input circuit are placed in an impedance-matched state, $R_s$ is normally given as $R_s=R_0$. A noise figure F (match) at this time is expressed as the following equation:

$$F(\text{match})=2+(4R_N/R_0) \quad (2)$$

The noise figure F (match) can be reduced as $R_N$ reaches $R_N<<R_0$ between the equivalent noise resistance $R_N$ and the termination resistance $R_0$. The noise figure F approaches 2 corresponding to a final asymptotic value.

On the other hand, when the antenna impedance and the input circuit are in an impedance-unmatched state, the noise figure is expressed by the following equation assuming that, for example, an error of $R_s=R_0$ (1±10%) exists between the impedance $R_s$ and the termination resistance $R_0$:

$$F\approx(2\pm5\%)+(4\pm10\%)(R_N/R_0) \quad (3)$$

When only the bandpass filter is used without using the LC parallel tuning circuit, $R_0=R_A$ is established between the termination resistance $R_0$ and the antenna impedance $R_A$. When $R_A=50$, the equivalent noise resistance $R_N$ may be considered to be $R_N>50$. Therefore, the noise figure F is considered to be approximately 6 or more.

When the matching to the antenna impedance is adjusted simultaneously when the LC parallel tuning circuit is used in the high frequency input circuit, the noise figure F (match) is expressed in the equation (2) from above. When the matching to the antenna impedance is approximately carried out while the LC parallel tuning circuit is used, the noise figure F is approximately expressed in the equation (3). In either case, the larger the termination impedance $R_0$ of the input circuit as compared with the equivalent noise resistance Rn, the more the noise figure F can be reduced. Thus, the noise figure F can be made close to the asymptotic value 2.

On the other hand, when only the bandpass filter is used in the high frequency input circuit without using the LC parallel tuning circuit, the noise figure F would be approximately 6 or more as described above.

SUMMARY OF THE INVENTION

The present invention has been made in terms of such a background art. An object of the present invention is to provide a receiver input circuit that makes it unnecessary to adjust matching to antenna impedance when a tuning frequency of an LC parallel tuning circuit is changed, and has satisfactory frequency selectivity and an improved noise figure.

In order to attain the above object, there is provided a receiver input circuit connected between a receiving antenna and a high frequency amplifier, which is equipped with means comprising:

a four-terminal R-∞ type low-pass filter having an input termination resistance indicative of a specific resistance value R and an output termination resistance indicative of an infinite resistance value; and an LC parallel tuning circuit connected to one output terminal of the four-terminal R-∞ type low-pass filter via a small-capacitance type coupling capacitor element, wherein the four-terminal R-∞ type low-pass filter has an inductor element and a first capacitor element series-connected between one input and output terminals thereof, and a second capacitor element shunt-connected between one and other output terminals thereof, wherein a series-connected portion of the first capacitor element and the second capacitor element corresponds to one in which a capacitor element shunt-connected between one and other output terminals of the four-terminal R-∞ type low-pass filter is divided into two, and a total capacitance value thereof is selected equal to a capacitance value of the shunt-connected capacitor element, wherein the LC parallel tuning circuit has a tuning capacitor element constituted of a first variable capacitance type capacitor element, wherein the small-capacitance type coupling capacitor element is constituted of a second variable capacitance type capacitor element, and wherein when a tuning frequency of the LC parallel tuning circuit is changed by adjusting the capacitance of the first variable capacitance type capacitor element, a capacitance value of the second variable capacitance type capacitor element is changed in conjunction with the adjustment to the capacitance thereof.

In the above means, the second variable capacitance type capacitor element corresponding to the small-capacitance type coupling capacitor element is selected so as to assume a capacitance variable range smaller in capacitance than each of a capacitance value of the first capacitor element, a capacitance value of the second capacitor element and a capacitance variable range of the first variable capacitance type capacitor element.

In this case, the above means makes use of the four-terminal R-∞ type low-pass filter. The four-terminal R-∞ type low-pass filter has the input termination resistance indicative of the specific resistance value R, and the output termination resistance indicative of the infinite resistance value. In the four-terminal R-∞ type low-pass filter, the value of the input termination resistance is an arbitrary resistance value R, and the value of the output termination resistance is an infinite resistance value R∞. That is, the four-terminal R-∞ type low-pass filter can be used in an output open state. However, even when the output termination resistance is of the infinite resistance value R∞, the infinite resistance value R∞ may be one that satisfies 50Ω<<R∞ when, for example, the input termination resistance R is selected as 50Ω in an actual case. If the infinite resistance value R∞ is a resistance value of a few kΩ or so or a resistance value larger than it, then the resistance value becomes almost trivial in operating the four-terminal R-∞ type low-pass filter. If the output termination resistance corresponding to the infinite resistance value R∞ is 50Ω<<R∞, then this has little effect on the transmission characteristic of the four-terminal R-∞ type low-pass filter even though the range of the resistance value R∞ slightly changes.

From such a viewpoint, the LC parallel tuning circuit can be driven by the output of the four-terminal R-∞ type low-pass filter if the resonance impedance of the LC parallel tuning circuit connected to the output side of the four-terminal R-∞ type low-pass filter is so higher than 50Ω within a variable range of usable tuning frequency even though the resonance impedance suitably changes depending upon a change in the tuning frequency. Thus, in the receiver input circuit according to the present invention, the four-terminal R-∞ type low-pass filter is used as an impedance matching circuit that eliminates the need for an adjustment for matching to antenna impedance.

In the receiver input circuit according to the present invention, the output of the four-terminal R-∞ type low-pass filter serves so as to drive the LC parallel tuning circuit through the second variable capacitance type capacitor element corresponding to the small-capacitance type coupling capacitor element. In this case, the resonance impedance as viewed on the LC parallel tuning circuit side from the output of the four-terminal R-∞ type low-pass filter may preferably be set high where the noise figure of the receiver input circuit is made satisfactory. If, at this time, the LC parallel tuning circuit is driven by the output of the four-terminal R-∞ type low-pass filter through the small-capacitance type coupling capacitor element or high-resistance coupling resistive element, then the resonance impedance can be rendered high. Although, however, the frequency selective characteristic can be made satisfactory in addition to the noise figure where the high-resistance coupling resistive element is used, a signal loss due to the high-resistance coupling resistive element increases considerably. It is not necessarily advisable to use the high-resistance coupling resistive element. Therefore, the small-capacitance type capacitor element is used in the present invention.

As described above, the receiver input circuit of the present invention brings about advantageous effects in that when a four-terminal R-∞ type low-pass filter formed by a simple circuit configuration, an LC parallel tuning circuit, and a small-capacitance type coupling capacitor element constituted of a second variable capacitance type capacitor element are used, and the tuning frequency of the LC parallel tuning circuit is adjusted by changing the capacitance of a first variable capacitance type capacitor element, the capacitance value of a second variable capacitance type capacitor element is followup-changed depending upon the change in the capacitance of the first variable capacitance type capacitor element, and an adjustment for matching to antenna impedance may not be performed simultaneously with the adjustment to the tuning frequency upon adjusting the tuning frequency, thereby making it possible to adjust the matching to the antenna impedance without taking a lot of time and effort, enhance frequency selectivity and improve a noise figure.

Other features and advantages of the present invention will become apparent upon a reading of the attached specification.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENTS

A preferred embodiment of the present invention will be explained hereinafter with reference to the accompanying drawings.

Figure 1:
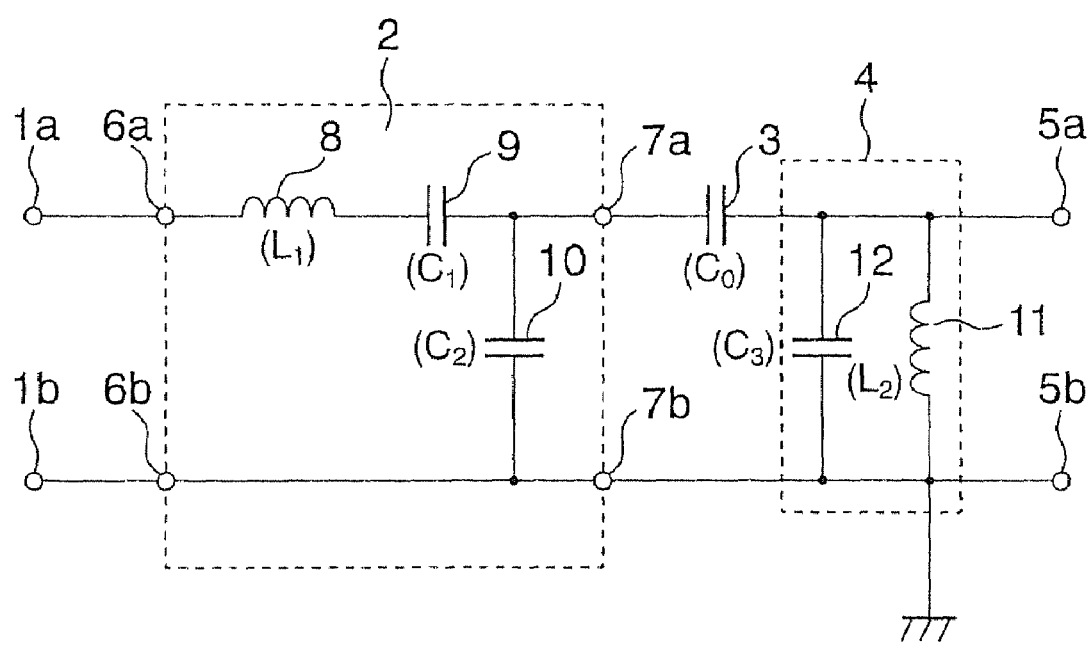
FIG. 1 is a circuit diagram showing one example of a configuration of a receiver input circuit according to the present invention.

FIG. 1 shows an embodiment of a receiver input circuit according to the present invention and is a circuit diagram illustrating a circuit configuration thereof.

As shown in FIG. 1, the receiver input circuit according to the present embodiment comprises a pair of input terminals 1a and 1b, a four-terminal R-∞ type low-pass filter 2, a small-capacitor type coupling capacitor element 3, an LC parallel tuning circuit 4, and a pair of output terminals 5a and 5b. In this case, the four-terminal R-∞ type low-pass filter 2 comprises a pair of input terminals 6a and 6b, a pair of output terminals 7a and 7b, an inductor element 8 and a first capacitor element 9 series-connected between the input terminal 6a and the output terminal 7a, and a second capacitor element 10 shunt-connected between the output terminal 7a and the output terminal 7b. The small-capacitance type coupling capacitor element 3 corresponds to a second variable capacitance type capacitor element 3 and is connected between the output terminal 7a of the four-terminal R-∞ type low-pass filter 2 and one end of the LC parallel tuning circuit 4. The small-capacitance type coupling capacitor element 3 suitably followup-varies its capacitance value depending upon a change in tuning frequency of the LC parallel tuning circuit 4.

The LC parallel tuning circuit 4 is connected between the pair of output terminals 5a and 5b and comprises a tuning inductor element 11 and a tuning first variable capacitance type capacitor element 12 both connected in parallel. Besides, the pair of input terminals 1a and 1b is connected to a receiving antenna (not shown in FIG. 1) and the pair of input terminals 6a and 6b of the four-terminal R-∞ type low-pass filter 2, respectively. The pair of output terminals 5a and 5b is connected to an input terminal of a high frequency amplifier (not shown in FIG. 1) of a receiver. Incidentally, the meaning of the small capacitance of the small-capacitance type coupling capacitor element 3 is that the small capacitance is selected so as to assume capacitance values lying in a variable range smaller than, specifically, a capacitance value of the first capacitor element 9, a capacitance value of the second capacitor element 10 and a capacitance variable range of the first variable capacitance type capacitor element 12, which are associated with the respective capacitor elements disposed around the small-capacitance type coupling capacitor element 3.

The inductor element 8 and the tuning inductor element 11, the small-capacitance type coupling capacitor element 3, the first capacitor element 9, the second capacitor element 10 and the tuning first variable capacitance type capacitor element 12 all of which are shown in FIG. 1, are respectively assumed to have inductance values and capacitance values to be described below for convenience of explanation. As to the four-terminal R-∞ type low-pass filter 2 in the first instance, the inductance value of the inductor element 8 is $L_1$, the capacitance value of the first capacitor element 9 is $C_1$, and the capacitance value of the second capacitance element 10 is $C_2$. As to the small-capacitance type coupling capacitor element 3, the capacitance value of the first variable capacitance type capacitor element 3 is a variable value $C_0$. Further, in the LC parallel tuning circuit 4, the inductance value of the tuning inductor element 11 is $L_2$ and the capacitance value of the tuning second variable capacitance capacitor element 12 is a variable value $C_3$.

The reason that while the capacitance value $C_3$ of the tuning second variable capacitance type capacitor element 12 is changed where the tuning frequency of the LC parallel tuning circuit 4 is changed, the small capacitance $C_0$ of the second variable capacitance type capacitor element 12 is followup-changed depending upon the change in the capacitance $C_3$, will now be explained as follows: As is well known, the resonance impedance of the LC parallel tuning circuit 4 is expressed in $\omega_0 L_2 Q$ (where $\omega_0$: resonant angular frequency, and Q: exponent indicative of merit or quality factor for the tuning inductor element 11). Assuming that the resistance value of an internal resistance of the tuning inductor element 11 is r in the tuning inductor element 11, its ratio or Q-factor value is expressed as $(\omega_0 L_2/r)$. Since $\omega_0 L_2 = (1/\omega_0 C_3)$ is established if the capacitance value $C_3$ of the tuning second variable capacitance type capacitor element 12 is used, $\omega_0 L_2 Q = (L_2/C_3 r)$. Assuming that the resistance value r does not produce a large change within a usable frequency range, the resonance impedance $\omega_0 L_2 Q$ is inversely proportional to the capacitance value $C_3$ of the tuning second variable capacitance type capacitor element 12.

On the other hand, when the absolute value of impedance of the capacitance value $C_0$ of the small-capacitance type coupling capacitor element 3 is determined, it reaches $(1/\omega_0 C_0)$. Since, however, $(1/\omega_0) = \sqrt{L_2 C_3}$, the absolute value becomes $(1/\omega_0 C_0) = \{(\sqrt{L_2 C_3})/C_0\}$. Thus, the capacitance value $C_0$ of the small-capacitance type coupling capacitor element 3 is proportional to the square root of the capacitance value $C_3$ of the tuning second variable capacitance type capacitor element 12. If $(1/\omega_0 C_0) << \omega_0 L_2 Q$ is established over the full varying usable frequency range in the case of such a relationship, then a signal outputted from the four-terminal R-∞ type low-pass filter 2 is supplied to the LC parallel tuning circuit 4 in a state in which it is almost unsubjected to a signal loss at the small-capacitance type coupling capacitor element 3. Since, however, the usable frequency range ($\omega$max/$\omega$min) often assumes about severalfold, it is considerably difficult to establish the condition of $(/\omega_0 C_0) << \omega_0 L_2 Q$ between the absolute value $(1/\omega_0 C_0)$ of the impedance of the small-capacitance coupling type capacitor element 3 and the resonance impedance $\omega_0 L_2 Q$ of the LC parallel tuning circuit 4.

Therefore, the receiver input circuit according to the present invention adopts the following means as means which makes it easy to establish the condition of $(1/\omega_0 C_0 << \omega_0 L_2 Q)$. That is, it is necessary to establish $\{(\sqrt{L_2 C_3})\}/\{C_0 C_3(\sqrt{C_3})\} = (\sqrt{L_2 C_3})\{C_0(\sqrt{C_3^3})$ for the purpose of making $\{(\sqrt{L_2 C_3})/C_0\}$ inversely proportional to the value of $C_3$. Therefore, when the capacitance value $C_3$ of the tuning second variable capacitance type capacitor element 12 is changed so as to be twice upon a change in tuning frequency, the capacitance value $C_0$ of the small-capacitance type coupling capacitor element 3 may be selected so as to assume $(\sqrt{2^3}) \approx$ three times.

When the normally-configured four-terminal R-∞ type low-pass filter is used and the output thereof is supplied to the LC parallel tuning circuit 4 through the small-capacitance type coupling capacitor element 3, the resonance impedance of the LC parallel tuning circuit 4 becomes low when the tuning frequency of the LC parallel tuning circuit 4 is sequentially lowered within its usable frequency range, and at the same time the impedance of the small-capacitance type coupling capacitor element 3 is also considerably reduced. Therefore, when the small-capacitance type coupling capacitor element 3 is connected to the output of the normally-configured four-terminal R-∞ type low-pass filter, there is also developed a case in which the termination resistance of the normally-configured four-terminal R-∞ type low-pass filter is no longer held in an open state. Thus, in the receiver input circuit according to the present invention, the signal gain of the four-terminal R-∞ type low-pass filter 2 is slightly sacrificed in such a manner that when the tuning frequency of the LC parallel tuning circuit 4 is changed, the load resistance of the four-terminal R-∞ type low-pass filter 2 is always maintained at a few k$\Omega$ or more (when R=50$\Omega$, 50$\Omega$ << a few k$\Omega$), and an impedance converting operation is performed on the output side of the receiver input circuit, whereby the load on the four-terminal R-∞ type low-pass filter 2 is reduced.

The impedance converting operation makes use of such a method to be described below. That is, the shunt-connected capacitor element connected to the output side of the four-terminal R-∞ type low-pass filter 2 is changed to the first capacitor element 9 and the second capacitor element 10 connected in series without changing its capacitance value. When, for example, the capacitance value of the shunt-connected capacitor element used in the normally-configured four-terminal R-∞ type low-pass filter is defined as $C_s$, the first capacitor element 9 and the second capacitor element 10 respectively having a capacitance value $2C_s$ equivalent to twice the capacitance value $C_s$ are connected in series, and a signal voltage developed across the second capacitor element 10 of the two is taken out. At this time, the signal voltage developed across the second capacitor element 10 is divided into two, each of which is brought to one-half the original signal voltage. However, a load resistor having a resistance value reduced by about one-fourth the resistance value of the load resistor connectable to the normally-configured four-terminal R-∞ type low-pass filter can be connected across the second capacitor element 10.

Incidentally, the ratio between the capacitance values of the first capacitor element 9 and the second capacitor element 10 at the time that the shunt-connected capacitor element is divided into the first capacitor element 9 and the second capacitor element 10 connected in series is not limited to such a 1:1 division ratio as mentioned above but may be another division ratio. Assuming that, for example, a first capacitor element 9 having a capacitance value equivalent to 10/7.5 times the capacitance value of the shunt-connected capacitor element, i.e., 1.333 times, and a second capacitor element 10 having a capacitance value equivalent to 30/7.5 times the capacitance value of the shunt-connected capacitor element, i.e., four times are connected in series, and a signal voltage developed across the second capacitor element 10 is taken out, a load resistor having a resistance value reduced by about one-sixteenth the resistance value of the load resistor connectable to the normally-configured four-terminal R-∞ type low-pass filter can be connected, thereby making it possible to greatly enlarge the range of usage of the four-terminal R-∞ type low-pass filter.

The reactance value of each element that constitutes the receiver input circuit according to the present embodiment is explained by citing one example as follows. That is, when the termination resistance Rs on the input side, of the four-terminal R-∞ type low-pass filter 2 is assumed to be Rs=50$\Omega$, and a cutoff angular frequency $\omega$c of the four-terminal R-∞ type low-pass filter 2 is assumed to be $\omega c = 2\pi \cdot 600$ (MHz) $\approx 3.77 \times 10^9$ (rad), the inductance value $L_1$ of the inductor element 8 of the four-terminal R-∞ type low-pass filter 2 becomes $1/(\sqrt{2}) \times (50/3.77 \times 10^9) \approx 9.38$ (nH) and the capacitance value of the shunt-connected capacitor element becomes $\{(\sqrt{2})/(50/3.77 \times 10^9) \approx 7.5$ (pF). However, in order to reduce the output impedance of the four-terminal R-∞ type low-pass filter 2, the shunt-connected capacitor element is divided into the two of the first and second capacitor elements 9 and 10 connected in series. Then, the capacitance value $C_1$ of the first capacitor element 9 is assumed to be $C_1$=10 (pF), and the capacitance value $C_2$ of the second capacitor element 10 is assumed to be $C_2$=30 (pF). The second variable capacitance type capacitor element 3 corresponding to the small-capacitance type coupling capacitor element 3 is one of such a type that its capacitance value $C_0$ can be varied between $C_0$=0.5 (pF) and 4.5 (pF). Then, the inductance value $L_2$ of the tuning inductor element 11 of the LC parallel tuning circuit 4 is assumed to be $L_2$=20 (nH) and its resistance value r is assumed to be r=0.5 ($\Omega$), and the capacitance value $C_3$ of the first variable capacitance type capacitor element 3 corresponding to the tuning capacitor element 12 can be varied between $C_3$=5 (pF) and 20 (pF). Further, the capacitance value $C_0$ and the capacitance value $C_3$ are varied in conjunction with each other.

Next, a noise figure F of the receiver input circuit according to the present embodiment is as follows:

As described above, the resonance impedance of the LC parallel tuning circuit 4 can be expressed in $(L_2/C_3r)$ When the influence of the capacitance $C_0$ of the small-capacitance type coupling capacitor element 3 is ignored because its capacitance value $C_0$ is small at this time, the input resistance or resistor of the four-terminal R-$\infty$ type low-pass filter 2 ranges from $R_0$=8 k$\Omega$ to 2 k$\Omega$. In this case, an equivalent noise resistance $R_N$ greatly differs depending upon the configuration of the receiver. If, however, $R_N$=100$\Omega$ as one example, then F becomes F=2+4 (100/2000)=2.2 when the input resistor $R_0$ is 2 k$\Omega$ corresponding to the minimum value, whereas F becomes F=2.05 when the input resistor $R_0$ is 8 k$\Omega$ corresponding to the maximum value.

On the other hand, when the receiver input circuit is constituted of a bandpass filter alone and an input signal received by the antenna is supplied to the high frequency amplifier through the bandpass filter, the input resistor $R_0$ may be set to $R_0$=50$\Omega$. Therefore, the noise figure becomes F=2+{4 (100/50)}=10, and hence a considerable large value is reached as the noise figure F. Thus, if the receiver input circuit according to the present embodiment is used, then the noise figure F can be greatly improved.

Figure 2:
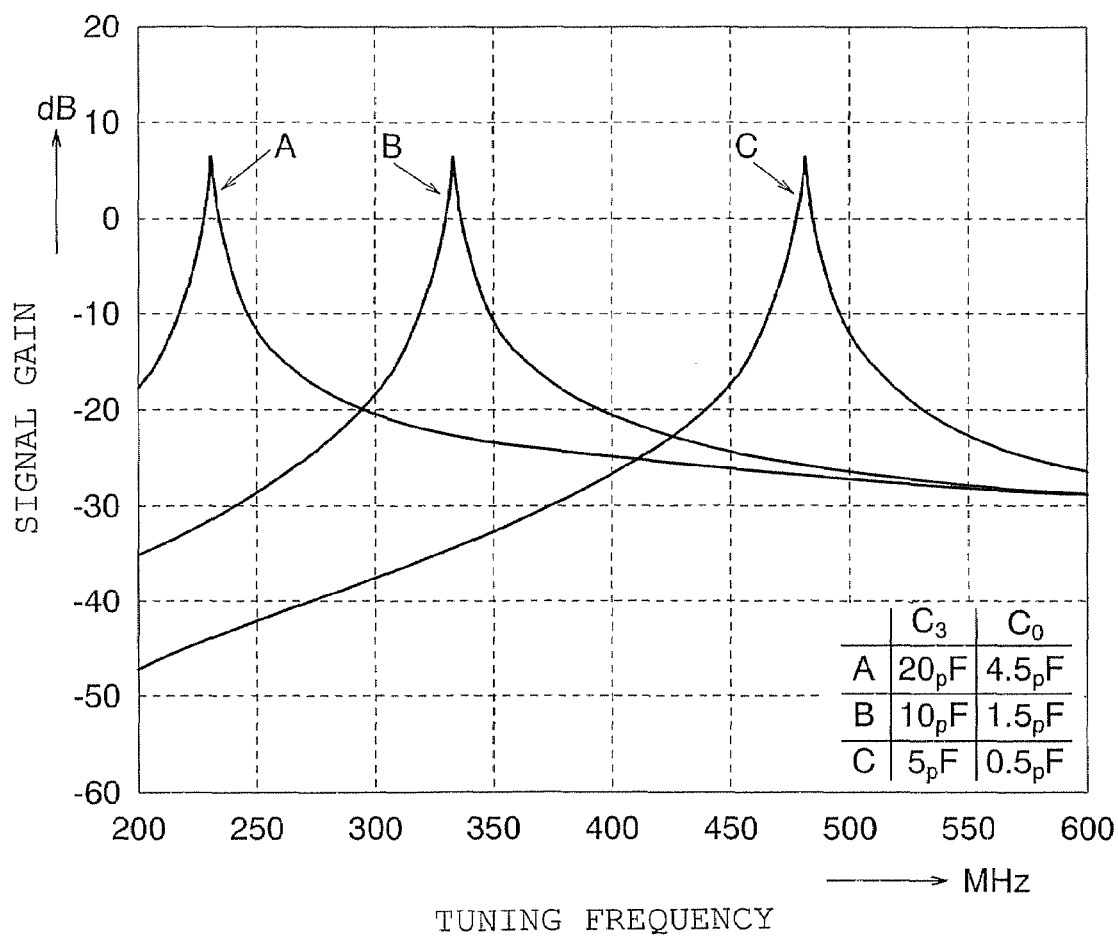
FIG. 2 is a characteristic diagram showing frequency selectivity characteristics of the receiver input circuit illustrating in FIG. 1.

Next, FIG. 2 is a characteristic diagram showing one example of a frequency vs. gain characteristic at the time that the receiver input circuit shown in FIG. 1 is used.

In FIG. 2, the horizontal axis indicates the frequency expressed in MHz, and the vertical axis indicates signal gain expressed in dB, respectively. A characteristic curve A illustrated in the figure is of a characteristic curve obtained when the tuning frequency of the LC parallel tuning circuit 4 is set to 230 MHz. A characteristic curve B illustrated in the figure is of a characteristic curve obtained when the tuning frequency of the LC parallel tuning circuit 4 is set to 330 MHz. A characteristic curve C illustrated in the figure is of a characteristic curve obtained when the tuning frequency of the LC parallel tuning circuit 4 is set to 480 MHz.

Of the respective characteristic curves A through C shown in FIG. 2, the characteristic curve A is obtained when the inductance value $L_2$ of the tuning inductor element 11 of the LC parallel tuning circuit 4 is selected so as to assume 10 (nH), the capacitance value $C_3$ of the tuning first variable capacitance type capacitor element 12 is selected so as to assume 20 (pF), and the capacitance value $C_0$ of the small-capacitance type coupling capacitor element 3 is selected so as to assume 4.5 (pF), respectively. The characteristic curve B is obtained when the inductance value $L_2$ of the tuning inductor element 11 of the LC parallel tuning circuit 4 is selected so as to assume 10 (nH), the capacitance value $C_3$ of the tuning first variable capacitance type capacitor element 12 is selected so as to assume 10 (pF), and the capacitance value $C_0$ of the small-capacitance type coupling capacitor 3 is selected so as to assume 1.5 (pF), respectively. The characteristic curve C is obtained when the inductance value $L_2$ of the tuning inductor element 11 of the LC parallel tuning circuit 4 is selected so as to assume 10 (nH), the capacitance value $C_3$ of the tuning first variable capacitance type capacitor element 12 is selected so as to assume 5 (pF), and the capacitance value $C_0$ of the small-capacitance type coupling capacitor 3 is selected so as to assume 0.5 (pF), respectively. In this case, the characteristic curves A through C are respectively equally 6 dB in terms of the maximum value of the signal gain and approximately uniform in terms of their frequency selective characteristics as well.

When the respective characteristic curves A through C are obtained, Q of the LC parallel tuning circuit 4 ranges from 31.5 to 63.0, and the input resistor $R_0$ of the four-terminal R-$\infty$ type low-pass filter 2 ranges from 2 K$\Omega$ to 500$\Omega$. If the equivalent noise resistance $R_N$ is $R_N$=100$\Omega$ in a manner similar to the above example, then the noise figure F at the input resistor $R_0$=500 results in F=2+4 (100/500)=2.8

If the receiver input circuit according to the present embodiment is used in this way, then the frequency selectivity characteristic and the maximum value of the signal gain become uniform even though the tuning frequency of the LC parallel tuning circuit 4 is changed within the usable frequency range, and the noise figure can be improved in conjunction with it.

While the preferred form of the present invention has been described, it is to be understood that modifications will be apparent to those skilled in the art without departing from the spirit of the invention. The scope of the invention is to be determined solely by the following claims.

What is claimed is:

1. A receiver input circuit connected between a receiving antenna and a high frequency amplifier, comprising:

a four-terminal R-$\infty$ type low-pass filter having an input termination resistance indicative of a specific resistance value R and an output termination resistance indicative of an infinite resistance value; and an LC parallel tuning circuit connected to one output terminal of the four-terminal R-$\infty$ type low-pass filter via a small-capacitance type coupling capacitor element, wherein the four-terminal R-$\infty$ type low-pass filter has an inductor element and a first capacitor element series-connected between one input and output terminals thereof, and a second capacitor element shunt-connected between one and other output terminals thereof, wherein a series-connected portion of the first capacitor element and the second capacitor element corresponds to one in which a capacitor element shunt-connected between one and other output terminals of the four-terminal R-$\infty$ type low-pass filter is divided into two, and a total capacitance value thereof is selected equal to a capacitance value of the shunt-connected capacitor element, wherein the LC parallel tuning circuit has a tuning capacitor element constituted of a first variable capacitance type capacitor element, wherein the small-capacitance type coupling capacitor element is constituted of a second variable capacitance type capacitor element, and wherein when a tuning frequency of the LC parallel tuning circuit is changed by adjusting the capacitance of the first variable capacitance type capacitor element, a capacitance value of the second variable capacitance type capacitor element is changed in conjunction with the adjustment to the capacitance thereof.

2. The receiver input circuit according to claim 1, wherein the second variable capacitance type capacitor element corresponding to the small-capacitance type coupling capacitor element is selected so as to take a capacitance variable range smaller in capacitance than each of a capacitance value of the first capacitor element, a capacitance value of the second capacitor element and a capacitance variable range of the first variable capacitance type capacitor element.

* * * * *